United States Patent [19]
Barker

[11] Patent Number: 5,502,903
[45] Date of Patent: Apr. 2, 1996

[54] FOOTWEAR WITH ILLUMINATED LINEAR OPTICS

[76] Inventor: Dale E. Barker, 1318 State St., Alton, Ill. 62002

[21] Appl. No.: 237,790

[22] Filed: May 4, 1994

[51] Int. Cl.$^6$ ............................. A43B 23/00; F21L 15/08
[52] U.S. Cl. ............................. 36/137; 36/136; 362/103; 362/32
[58] Field of Search ............................. 36/137, 136, 132, 36/2.6; 362/103, 32, 800; 24/713.1

[56] References Cited

U.S. PATENT DOCUMENTS

| | | | |
|---|---|---|---|
| 352,064 | 11/1886 | Orne | 24/713.1 |
| 752,433 | 2/1904 | Bagley | 24/713.1 |
| 1,166,495 | 1/1916 | Tizzard | 362/103 |
| 1,209,059 | 12/1916 | Smith | 362/103 X |
| 2,304,367 | 12/1942 | Meyer et al. | 362/103 X |
| 2,473,877 | 6/1949 | Goldstein | 36/137 |
| 2,671,847 | 3/1954 | Lerch | 362/103 |
| 3,067,322 | 12/1962 | Sala | 36/137 X |
| 3,564,232 | 2/1971 | Elberbe | 240/6.4 |
| 3,663,796 | 5/1972 | Hines et al. | 36/2.6 X |
| 3,800,133 | 3/1974 | Duval | 240/6.4 |
| 3,893,247 | 7/1975 | Dana, III | 36/2.5 |
| 4,020,572 | 5/1977 | Chiaramonte, Jr. | 36/137 |
| 4,128,861 | 12/1978 | Pelengaris | 362/103 |
| 4,130,951 | 6/1978 | Powell | 36/137 |
| 4,158,922 | 6/1979 | Dana, III | 36/137 |
| 4,234,907 | 11/1980 | Daniel | 362/103 X |
| 4,438,482 | 3/1984 | Leon et al. | 362/103 |
| 4,441,483 | 4/1984 | Cieslak et al. | 36/2.6 X |
| 4,471,412 | 9/1984 | Mori | 362/32 |
| 4,704,660 | 11/1987 | Robbins . | |
| 4,727,603 | 3/1988 | Howard | 362/103 X |
| 4,848,009 | 7/1989 | Rodgers | 36/137 |
| 4,957,347 | 9/1990 | Zarian . | |
| 5,033,212 | 7/1991 | Evanyk | 36/137 |
| 5,042,892 | 8/1991 | Chiu et al. | 362/32 X |
| 5,051,095 | 9/1991 | Slenker | 36/2.6 X |
| 5,052,131 | 10/1991 | Rondini | 36/137 |
| 5,052,778 | 10/1991 | Jamshid . | |
| 5,067,831 | 11/1991 | Robbins et al. . | |
| 5,122,580 | 6/1992 | Zarian et al. . | |
| 5,149,467 | 9/1992 | Zarian . | |
| 5,149,489 | 9/1992 | Crews | 362/32 |
| 5,221,387 | 6/1993 | Robbins et al. . | |
| 5,353,786 | 10/1994 | Wilk | 362/32 X |

FOREIGN PATENT DOCUMENTS

| | | | |
|---|---|---|---|
| 0146353 | 11/1903 | Germany | 36/2.6 |
| 405137604 | 6/1993 | Japan | 36/137 |

Primary Examiner—Paul T. Sewell
Assistant Examiner—Ted Kavanaugh
Attorney, Agent, or Firm—Haverstock, Garrett & Roberts

[57] ABSTRACT

Illuminated footwear having a power source, at least one light source operatively connected to the power source, a switching circuit for selectively illuminating the light source, and a linear side-glow optical conduit positioned exteriorly on the footwear so as to be visible when illuminated, the linear optical conduit having opposed end portions and being capable of emitting light conducted therethrough radially outwardly from its circumferential periphery substantially along its entire length, at least one end portion of the linear optical conduit being positioned and located in close proximity to the light source so as to receive light therefrom when illuminated, the linear optical conduit being illuminated substantially along its entire length when the light source is selectively illuminated. In the preferred embodiment, the linear optical conduit extends substantially around the outer exterior front and side portions of the footwear, although other arrangements are also disclosed herein. An interchangeable filter member may also be positioned between the light source and the one end portion of the linear optical conduit positioned in close proximity thereto, the filter member determining the color of the light directed towards the linear optical conduit end portion. The main features of the present invention are also incorporated into a self-contained portable illumination unit which can be easily attached to and removed from a wide variety of footwear. All embodiments of the present invention are adaptable for use on and with a wide variety of different types and styles of footwear.

14 Claims, 3 Drawing Sheets

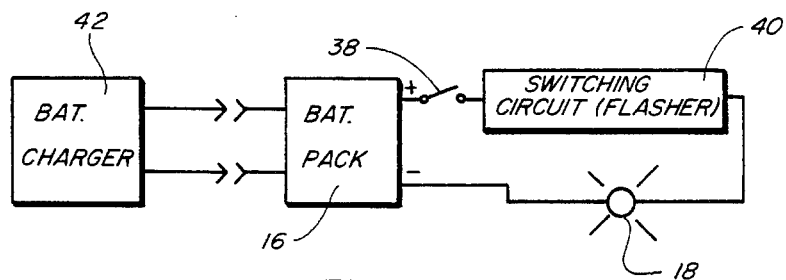
Fig. 5
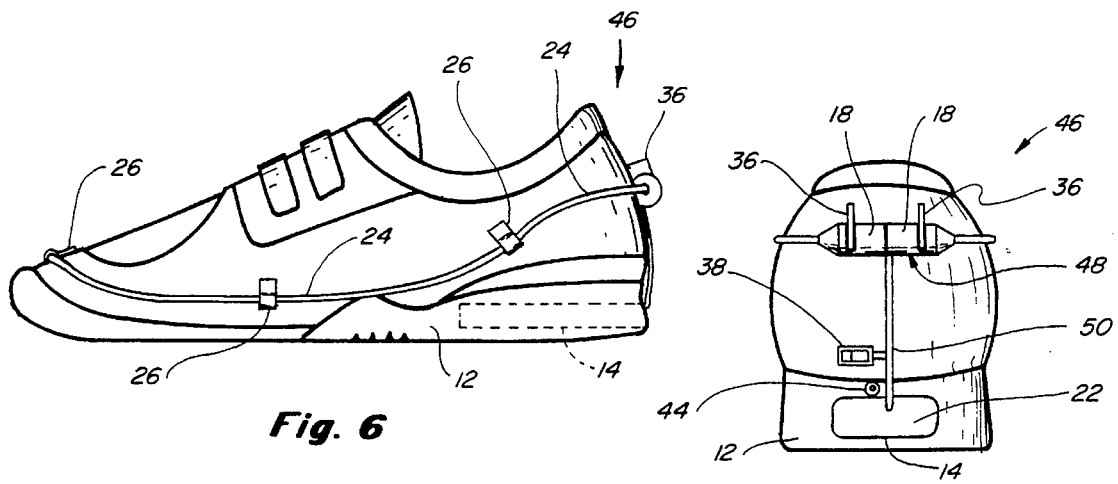
Fig. 6
Fig. 7
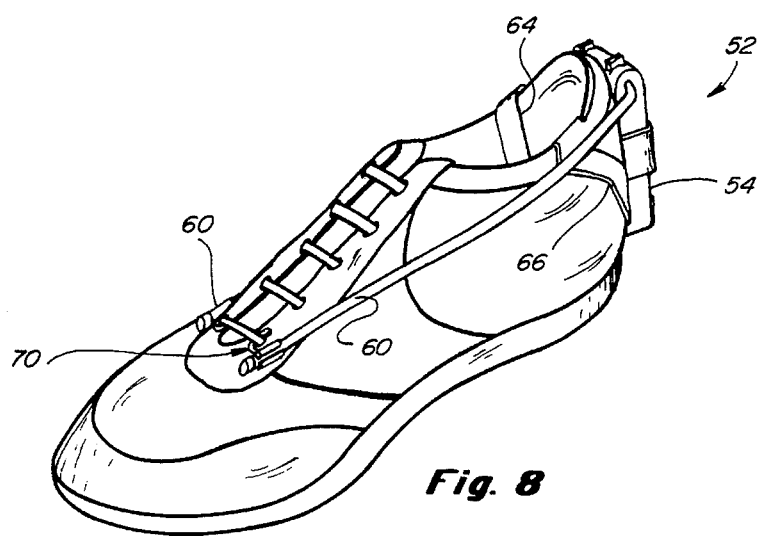
Fig. 8

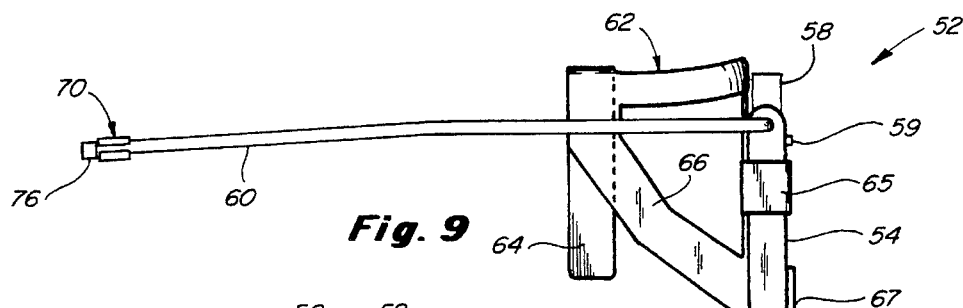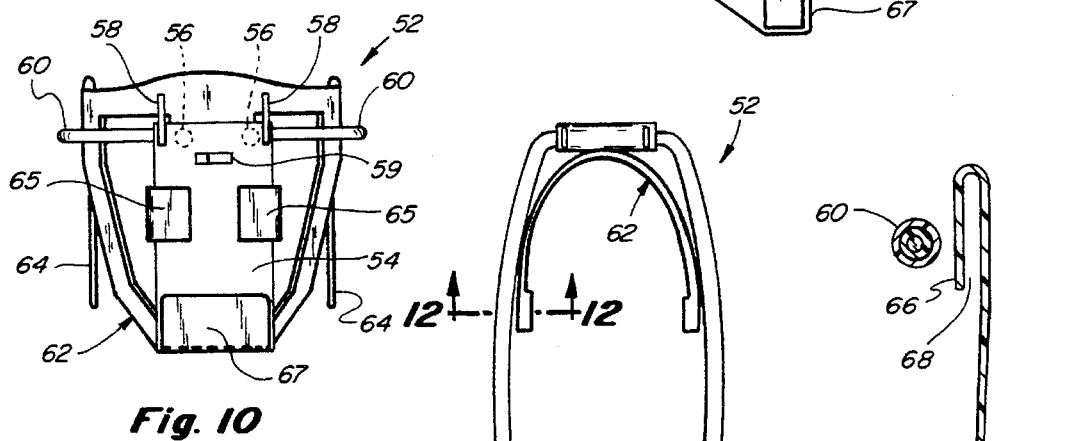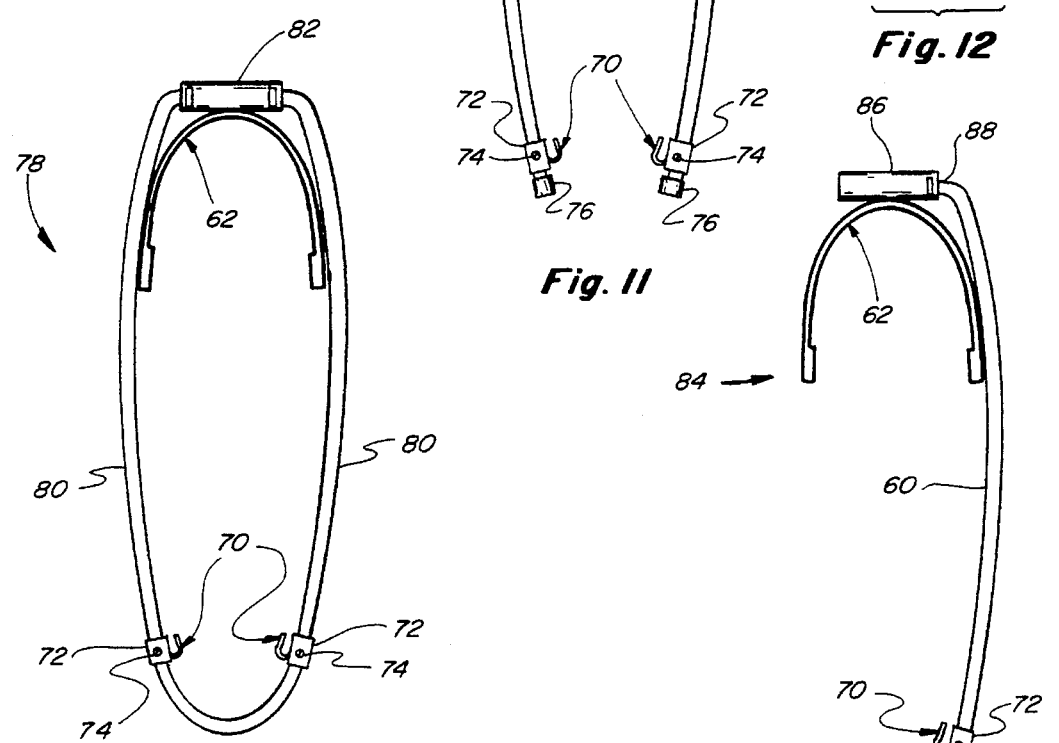

FOOTWEAR WITH ILLUMINATED LINEAR OPTICS

The present invention relates generally to illuminated footwear and, more particularly, to several embodiments of an illuminated shoe which utilizes a linear optical conduit to produce a side-light or side-glow effect which substantially resembles that of neon lighting. The optical transmission properties of the linear optical conduits utilized in the present invention are such that a major portion of any light conducted therethrough will emit sidewardly or radially outwardly from the outer circumferential surface of such conduits along their entire length in a substantially uniform manner, and with a greater light intensity than the lights associated with illuminated shoes presently available in the marketplace. Use of the present illumination means on footwear produces substantially the same aura or glow associated with neon lighting and provides a very attractive and decorative shoe which is highly visible at night from substantially all orientations. All of the various embodiments of the present invention are ideally suited for use with a wide varitey of different styles and types of footwear including casual and dress shoes, athletic shoes, ice and roller skates, in-line skates or roller blades, boots, high-top shoes and other similar footwear.

BACKGROUND OF THE INVENTION

Many different types of illuminated footwear are well known in the art. Typical of such illuminated shoe constructions are those identified in U.S. Pat. Nos. 5,149,489; 5,052,131; 5,033,212; 4,848,009; 4,158,922; 4,130,951; 4,128,861; 4,020,572; 3,893,247; 3,800,133; and 3,564,232 to name a few. Such known constructions generally use miniaturized light-emitting diodes or LEDs, miniaturized point lights, or a plurality of bundled light carrying optical fibers which are housed along with appropriate circuitry for energizing the same within the structure of the shoe so as to produce some type of visible illumination from various portions of the shoe. Typically, such illumination includes point light illumination spaced at various locations around the sole portion of the particular shoe being illuminated as illustrated in U.S. Pat. Nos. 5,033,212; 4,158,922; 4,130,951 and 5,149,489. Although all of the known footwear illumination means achieve some type of decorative illumination of various portions of the shoe, be it either constant or flashing illumination, none of the known constructions utilize linear optics to achieve a neon look of outstanding brightness, evenness and flexibility as will be hereinafter explained.

The present invention utilizes linear optics in order to achieve its desired illumination effect. Linear light forms have been known for many years and have been utilized in many different types of practical lighting applications such as decorative an forms, pool and spa perimeter and underwater lighting, aisle lighting, and other special effects type illumination. True linear light forms are those in which the source of light is contained within the light form itself such as neon lights, fluorescent lights and other types of tube lighting. Although the present invention strives to achieve a neon type glowing light effect, such simulation is achieved through the use of linear optical conduits wherein the source of illumination is external to the particular optical conduit. In essence, the linear optical conduit functions to conduct and transmit therethrough the light generated by the external source. Optical conduits are commonly referred to as "fiber optics" or "optical fibers". Fiber optics encompass three distinctly different types of functions, namely, telecommunications, coherencies and illumination. Telecommunications fiber optics are used in telephone communications to transmit light from a source to a remote point. Coherent functions involve transmission of a visible image along a bundle of flexible fiber optic conduits to a remote point in such a manner that the placement of the fibers relative to each other at the remote point of site reception is exactly that of the placement of the ends of the fibers relative to each other at the source point of the image of the object which is being transmitted. Both telecommunications and coherent fiber optics are considered point lights and emission of light out of the sides of the optical conduits is to be avoided. Many of the known prior art illuminated shoe constructions utilize some type of fiber optics to achieve point lighting. See, for example, U.S. Pat. No. 4,130,951.

In total contrast, the present invention utilizes a linear optical conduit or other radially emitting light transmissive material wherein the primary function of the linear optical conduit is to provide a means of conducting light from a light source linearly along the length of such optical conduit and thereafter emitting such light from the sides thereof along its total length. The present invention is therefore specifically directed to the use of illuminated linear optics in associated with footwear and, more particularly, to the use of linear optical conduits which, when illuminated, produce a side-light effect somewhat similar to that of a neon light along its entire length.

SUMMARY OF THE INVENTION

The present invention teaches the construction and operation of several embodiments of an illuminated shoe or other footwear wherein a linear optical conduit or other linear side-glow type fiber optic material is positioned adjacent the exterior portion of the shoe such that at least one end portion of such material lies adjacent to a light source for illuminating the same. The present shoe includes a battery or other electrical power supply means, light means, and all of the appropriate circuitry necessary for illuminating the light means when a particular on/off switch is activated. In one embodiment of the present invention, both the power means and the light means are housed in a cavity located in the heel of the shoe, and in another embodiment, the present light means are located exterior of the shoe adjacent the rear portion thereof. The linear optical conduit can be attached to the exterior portion of the shoe by any suitable means such as by stitching, gluing, clamping or other attachment means such that at least one end portion thereof is positioned adjacent the light source. In the particular embodiment where the light source is housed within the heel cavity, the optical conduit is fed into such cavity through suitable openings formed in the heel portion of the shoe. Suitable switch means for energizing the light source is preferably located on the outer periphery of the heel portion of the shoe, although such switch means may be conveniently located elsewhere.

In the preferred embodiment, the linear optical conduit is of a one-piece continuous construction which extends substantially around the entire shoe from each opposite side of the rear portion thereof. In this regard, it is generally preferred that two separate light means be utilized to illuminate the side-glow type material and that each opposite end portion of such material be positioned in close proximity to such light means to illuminate the same. Although a suitable neon-type glow effect will be produced along its entire length when a light source is directed towards at least one end portion of such material, directing light through both opposite end portions of the present linear optical conduit will increase both the intensity and efficiency of such illumination along the entire length of such side-glow material. The present side-glow type material can also be manipulated to produce various patterns on the shoe and such patterns are not limited to the specific arrangements disclosed herein. Since the linear optical conduit substantially surrounds the entire shoe, it is visible from substantially all orientations when illuminated.

Interchangeable lens or filter means may also be positioned between each respective light source and each respective end portion of the side-glow type fiber optic material, the color of the particular lens/filter means establishing the particular color associated with the neon lighting effect produced by the present invention. In this regard, it is important that the cavity or compartment housed in the heel portion of the shoe be accessible such that the particular colored lens or filter means may be periodically changed to produce a different neon-type color. Access to such heel cavity is also important for battery and light source replacement. It is further anticipated that battery recharging means may also be incorporated into the present invention such that the battery or other power means housed within the heel cavity may be charged through separate adapter means without removing the battery or other power source from the housing compartment. Other recharging configurations are likewise possible.

An alternative embodiment of the present invention resides in a portable self-contained illumination unit which includes battery means, a light source, filter means, the linear optical conduit and all necessary circuitry for illuminating the light source and the linear optics via an on/off switch. This particular embodiment includes a bracket assembly which enables the subject device to be removably attached to any particular shoe for use therewith. The bracket means enables this particular embodiment of the present invention to be attached to the rear portion of the shoe such that the linear optical conduit will extend forward towards the front portion thereof. This portable unit can be removably attached and secured to any particular shoe structure depending upon the needs and desires of the user and, as such, affords such a user greater flexibility in that it can be used with many different types and styles of footwear. However, regardless of whether the present illumination means is incorporated directly into a particular shoe, or whether such means are incorporated into a removably attachable device, use of a linear side-light material is paramount to the present invention since such optical materials achieve high intensity light output while offering operational and maintenance cost savings. Also, importantly, since no electricity passes through the linear optical conduit, the present system is extremely safe for use.

It is therefore a principal object of the present invention to provide footwear having improved illumination means associated therewith which is highly visible from substantially all orientations.

Another object is to provide footwear having illumination means wherein the illumination means includes the use of linear optical conduits or other linear side-glow type materials which allow light to radiate sidewardly therethrough along their entire length.

Another object is to teach the use of linear optics in shoe illumination means wherein the linear optics utilized has greater light emission from its circumferential periphery for a given light source as compared to known shoe illumination means.

Another object is to provide footwear having illumination means which produce a neon-like glow effect when illuminated.

Another object is to provide footwear having illumination means wherein the particular color associated with the side-glow type material can be changed to produce a different color.

Another object is to provide footwear utilizing illumination means wherein the side-glow type material can be manipulated to produce various patterns on such footwear.

Another object is to teach the construction and operation of illuminated footwear which utilizes side-glow type fiber optic material wherein the fiber optic material has a relatively uniform light emission distribution from its circumferential periphery even at regions where bends exist.

Another object is to teach the construction and operation of a self-contained illumination system which is easily attachable to and detachable from a wide variety of different types of footwear to provide illumination means therefor.

These and other objects and advantages of the present invention will become apparent to those skilled in the art after considering the following detailed specification in conjunction with the accompanying drawings.

BRIEF DESCRIPTION OF THE DRAWINGS

FIG. 5 is a block diagram illustrating circuitry which may be utilized in conjunction with the present invention;

FIG. 6 is a side elevational view of a shoe incorporating another embodiment of the present invention;

FIG. 7 is a rear elevational view of the shoe illustrated in FIG. 6;

FIG. 8 is a perspective view of a shoe illustrating still another embodiment of the present illumination means attached thereto;

FIG. 9 is a side elevational view of the self-contained portable illumination unit illustrated in FIG. 8;

FIG. 10 is a rear elevational view of the self-contained portable illumination unit illustrated in FIGS. 8 and 9;

FIG. 11 is a top plan form view of the self-contained portable illumination unit illustrated in FIGS. 9 and 10;

FIG. 12 is a cross-sectional view taken along line 12—12 of FIG. 11; and

FIGS. 13 and 14 are top plan form views illustrating still other embodiments of the self-contained portable illumination unit illustrated in FIGS. 8–12.

DETAILED DESCRIPTION OF THE INVENTION

Figure 1:
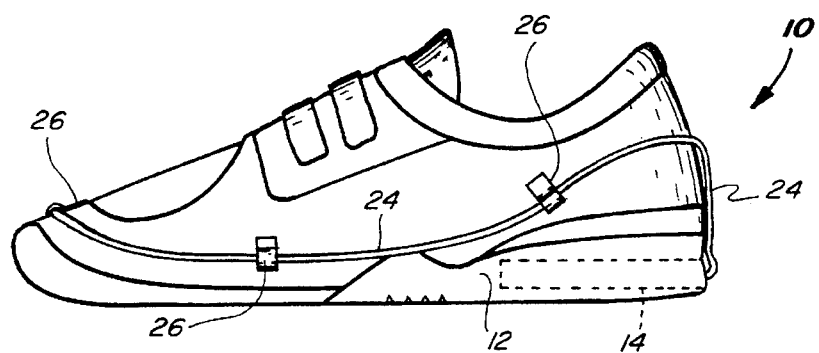
FIG. 1 is a side elevational view of one embodiment of a shoe incorporating illumination means constructed according to the teachings of the present invention.
Figure 2:
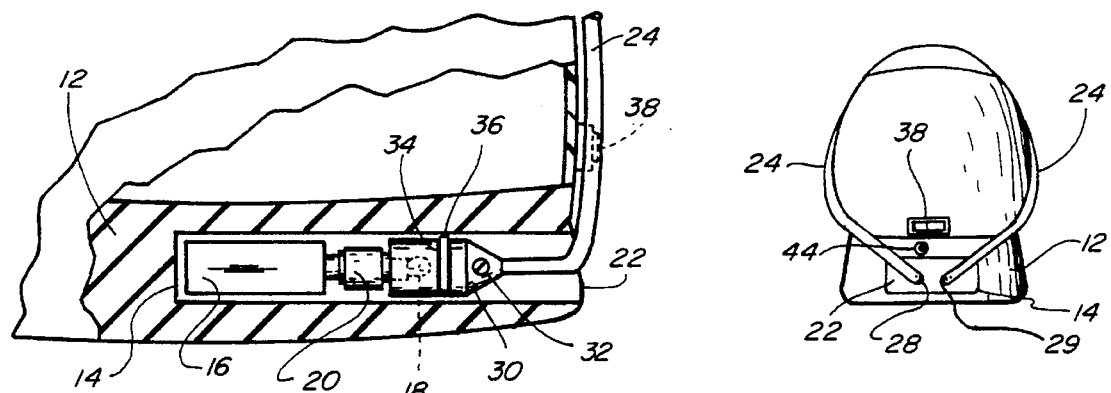
FIG. 2 is a fragmentary partial cross-sectional view of the heel portion of the shoe illustrated in FIG. 1 showing the heel cavity and the electrical components contained therewithin.
Figure 3:
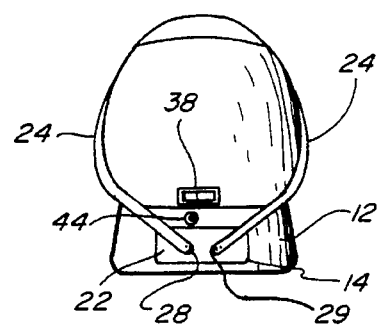
FIG. 3 is a rear elevational view of the shoe illustrated in FIG. 1.

Referring to the drawings more particularly by reference numbers wherein like numerals refer to like parts, number 10 in FIG. 1 identifies one embodiment of an illuminated shoe constructed according to the teachings of the present invention. The shoe 10 includes a heel portion 12 which houses a cavity 14 as best shown in FIGS. 1 and 2, the cavity 14 being sized and dimensioned so as to receive and hold at least one battery or other electrical power means 16, a light source 18 and connector means 20 for electrically connecting or coupling the power supply means to the light source as best illustrated in FIG. 2. The power supply means 16 may include any plurality of batteries sufficient to power the light source 18 depending upon the size and wattage associated therewith as well as the particular circuitry involved. In this regard, the light source 18 may include one or two individual light bulbs as will be hereinafter explained. The connector means 20 coupling the battery 16 to the light source 18 may be of any conventional design and structure depending upon both the size and number of batteries and light bulbs positioned within the heel cavity 14. Although the opening to the cavity 14 is illustrated in FIG. 3 as being oriented towards the rear portion of the heel 12, it is recognized and anticipated that access to the cavity 14 can be accomplished in a multitude of different configurations including having the cavity opening located on any of the various side edge portions of the heel 12 as well as located on its underside portion. A closure member 22 as best illustrated in FIG. 3 is cooperatively engageable with the cavity opening to protect and seal the electrical components positioned therewithin. Here again, it is recognized that a wide variety of closure means may likewise be utilized to accomplish this task.

The main feature of the present invention lies in the use of a linear optical conduit or side-glow type fiber optic material 24 which extends around the outer exterior portion of the shoe 10 as best illustrated in FIGS. 1 and 3. The linear optical conduit 24 can be attached to the shoe 10 by any suitable means such as through the use of the fastener means 26 illustrated in FIG. 1. The fasteners 26 are permanently affixed to the exterior portion of the shoe 10 and are constructed to receive and engage the optical conduit 24 when positioned therewithin. Any plurality of fasteners 26 may be used to securely hold the optical conduit 24 in proper position around the periphery of the shoe as illustrated. It is also recognized that other suitable attachment means may likewise be utilized such as by stitching the optical conduit 24 to the shoe 10; using a plurality of belt-loop type holding means permanently affixed to the shoe through which the optical conduit 24 can be fed; gluing the optical conduit 24 to the exterior portion of the shoe 10; and other suitable means.

Figure 4:
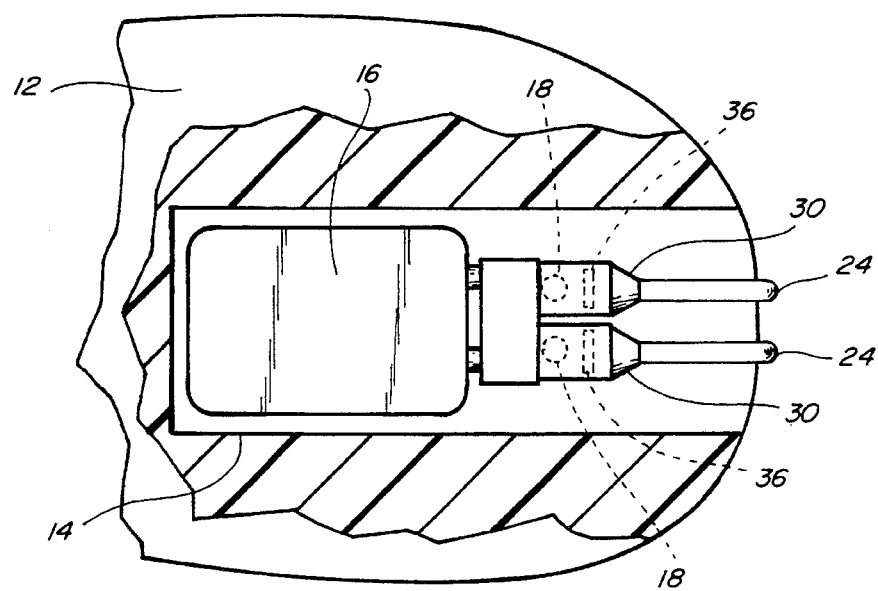
FIG. 4 is a fragmentary partial cross-sectional view of the underside portion of the heel of the shoe illustrated in FIGS. 1 and 2.

Referring to FIGS. 2–4, it can be seen that the respective opposite end portions of the linear optical conduit 24 are fed through respective openings 28 and 29 located in the closure member 22 and, as best illustrated in FIGS. 2 and 3, each respective end portion of the conduit 24 is engaged with a suitable coupling or fastener means 30 so as to hold the conduit end portions in close proximity adjacent to the light means 18. The coupling arrangement 30 includes a set screw 32 for holding and retaining the conduit end portion in proper position within the coupling means as illustrated, although other suitable coupling or clamping means may likewise be utilized. As best shown in FIG. 4, although a single light source focused on one or both opposite end portions of the linear optical conduit 24 will provide sufficient illumination to the optical conduit 24 to produce the desired effect, it is preferred that two separate light sources be utilized in the heel cavity 14 to increase the overall illumination effect, each light source 18 being directed and focused at one of the respective opposite end portions of the optical conduit 24.

Although several different types of linear optical conduits can be utilized with the present invention, it is generally preferred that the linear optical conduit 24 be comprised of a clad, optical conduit manufactured and sold by the Lumenyte International Corporation of Costa Mesa. Calif. and sold under the trademark "LUMENYTE"®. The "LUMENYTE"® fiber optic conduit is comprised of a light transmitting core having a relatively high refractive index which is surrounded by a tubular cladding made of a heat shrinkable material having a relatively low refractive index as compared to that of the core, such as a fluoropolymer including "TEFLON"® which provides a snug, uniform cladding around such core. The core may be made of polymeric material as disclosed in U.S. Pat. No. 5,122,580, or it may be made of glass or other known materials used for the manufacture of optical conduits. The "LUMENYTE"® fiber optic conduit includes a relatively thin, minimized, uniform gap between the cladding and the core. The light transmitting core and cladding are housed within a clear, semi-rigid finish jacket, the preferred method for forming the finish jacket around the fluoropolymer cladding being by extruding the finish jacket around the clad, cured light transmitting core using a cross heat extrusion dye. The details associated with "LUMENYTE"® linear optical conduits are set forth in U.S. Pat. No. 5,221,387. This particular material is ideal for use with the present invention since the "LUMENYTE"® optical conduit has improved optical efficiency in that it provides for relatively uniform light emission distribution from its circumferential periphery even at regions where bends exist. This means that the "LUMENYTE"® conduit allows light to radiate outwardly through its sides along its entire length so as to provide a neon-type look of outstanding brightness and uniformity. Also, importantly, use of the "LUMENYTE"® material likewise has an aura or glow analogous to that of neon-type lighting.

Although clad, optical conduits made by other processes such as those described in U.S. Pat. Nos. 3,641,332 and 5,122,580 may likewise be utilized with the subject invention, such optical conduits are not as optically efficient as the "LUMENYTE"® conduit described above and, in fact, experience scattering problems in that they exhibit numerous bright and dark spots along the length of such conduits especially where bends occur. In this regard, it is important to understand that the coated optical conduits within the field of the present invention must produce linear lighting, that is, such optical conduits must provide a means of conducting light form a light source linearly along the length of the material and must be capable of emitting such light at both the opposite end portion of the conduit from such light source as well as through the circumferential periphery thereof along its entire length. In this regard, the "LUMENYTE"® material is preferred because it provides for a more intense emission of light along its entire length; it allows a greater percentage of the total light conducted therethrough to be emitted from its circumferential periphery than from its non-source end portion; and it emits light relatively uniformly along its entire length, including bends, as compared to other optical conduits which tend to have a higher illumination intensity at the bend portions thereof as compared to along their straight portions. Such other optical conduits include thermoplastic and thermoset optical conduits.

Because of the unique characteristics of the linear side-glow fiber optic material used in the present invention, it is important to position at least one end portion of the optical conduit 24 adjacent the light source as best shown in FIGS.

2 and 4 so that light may be directed towards and transmitted through such conduit end portion and along the entire length thereof to produce the desired effect as explained above. It is generally preferred that a light source be positioned adjacent each opposite end portion of the optical conduit 24 as best illustrated in FIG. 4 since this increases the illumination intensity of the linear optical conduit, although a single light source directed towards either one or both opposite end portions of the conduit 24 will also produce the desired effect but at a somewhat lower intensity. Color variation can be established by means of filtering the light at the light source. In this regard, it is generally preferred that the linear optical conduit 24 be substantially clear or transparent and that a lens or filter means be positioned between each respective light source and each respective conduit end portion as best shown in FIG. 2. The filter means illustrated in FIG. 2 comprises a slot 34 formed in the housing containing the light source 18 between the light source and the coupling member 30, the slot 34 being sized and dimensioned so as to frictionally receive a color filter member 36. The filter member 36 is slidably insertable and removable from the slot 34 such that the filter member 36 may be periodically changed to vary the color of light transmitted through the linear optical conduit 24. As shown in FIG. 4, a filter member 36 as well as means for holding the same in proper position between the light source 18 and the respective opposite end portion of the conduit 24 is associated with each light source utilized. It is recognized and anticipated that a wide variety of other filtering arrangements as well as a wide variety of holding means for maintaining the filter in proper position can likewise be utilized without departing from the spirit and scope of the present invention. Access to the heel cavity 14 through the closure member 22 allows a user to easily change the filter member 36 as desired. This access also allows a user to change the battery and light source when necessary. In this regard, it is anticipated that all of the electrical components housed within the heel cavity 14 can be positioned and located on a member (not shown) which can be slidably inserted and removed from the cavity 14 for easy access to all components located thereon. Other component arrangements to facilitate easy access to the power source 16, the light source 18, and the filter members 36 are likewise contemplated.

FIG. 5 illustrates a typical circuit which may be utilized in order to provide electrical power from the battery pack 16 or other suitable power source to the light source 18. An on/off switch 38 is positioned between the battery pack 16 and the switching circuit 40 in order to positively control activation of the light source 18. The on/off switch 38 may be positioned at any convenient location on the outer portion of the shoe such as just above the outer periphery of the heel as shown in FIG. 3. The switching circuit 40 may include any suitable circuitry to accomplish a wide variety of tasks such as a wide variety of oscillator circuits to pulse or flash the light source to produce a flashing, blinking or strobing effect; or a 555 timer chip to automatically de-energize the circuit after a certain elapsed time, to cut in the oscillator circuit, or to activate other switches such as a tilt switch or pressure switch which can be located in the heel or sole of the shoe to automatically activate the light source when the sole or heel of the shoe makes contact with a walking surface or in response to movement of the shoe itself. The switching circuit 40 may also include discrete components such as RC (resistor-capacitor) timing circuits, microprocessor or microcontroller chips to likewise activate the light source 18 in any particular manner. Other circuits and other components can likewise be utilized with the present invention in order to activate the light source 18 in any particular manner to achieve any particular desired effect. Regardless of the type of circuit utilized, it is important that such circuitry be capable of high performance even in the fairly rough environment that a shoe will experience. Additionally, such circuitry must be capable of easy mounting in the shoe as illustrated in FIGS. 2, 4 and 5. FIG. 5 also discloses use of a battery recharging mechanism 42 which can be incorporated into the present shoe design in order to recharge the battery pack 16 without removing the battery from the heel cavity 14. This recharging capability can be accomplished in a multitude of ways such as by using a battery recharging adapter (not shown) having at least one recharger plug or connector associated therewith which will cooperatively engage a corresponding receiver or receptacle located on the heel portion of the shoe such as the recharger receptacle 44 illustrated in FIG. 3. One or two receiver receptacles 44 can be used with each shoe 10 depending upon the particular male/female recharger arrangement desired. It is also anticipated that the recharger adapter will include a sufficient number of male plugs or connectors so that both shoes of a particular pair can be recharged at the same time. It is contemplated that a wide variety of other recharging arrangements can likewise be utilized in conjunction with the present invention.

FIGS. 6 and 7 illustrate another shoe embodiment 46 which is somewhat similar to the shoe embodiment 10 but differs therefrom in that the light source 18 and the filter means 36 have been removed from the heel cavity 14 and have been positioned and located on the rear exterior portion of the shoe as best illustrated in FIG. 7. The light/filter/coupling member 48 can be attached to the exterior portion of the shoe 46 by any suitable means such as by stitching, gluing, or other convenient means. Appropriate wiring 50 connecting the light source 18 to the power source 16 housed within the heel cavity 14 can be routed either interiorly or exteriorly on the shoe. All other features of the present invention as disclosed with respect to embodiment 10 remain substantially the same including the interchangeability of the filter members 36, use of the on/off switch 38, and use of the recharger receiver receptacle 44 as illustrated in FIGS. 7. This particular embodiment provides easier access to the light source 18 and the filter members 36 for the changeability of such components when desired and it likewise reduces the overall manufacturing costs involved since it requires a smaller heel cavity 14 as compared to the cavity associated with the embodiment 10 and it requires the use of a shorter length linear optical conduit 24, which conduit is extremely expensive. In all other respects, the illuminated shoe embodiment 46 operates and functions similar to that embodiment 10.

FIGS. 8–14 illustrate several embodiments of a self-contained portable illumination unit which can be easily attached to and removed from a wide variety of ordinary footwear which do not include illumination means. For example, the illumination unit 52 illustrated in FIGS. 8–12 includes a battery or power pack 54, light means 56, color filter means 58, an on/off switch 59, and two separate linear optical conduits 60, one end portion of each optical conduit 60 being positioned and located adjacent each respective light and filter means 56 and 58 respectively via coupling means similar to the coupling members 30 utilized with respect to the embodiment 10 previously described. All of the above-described components as well as the associated coupling means for engaging the conduit end portions are fixedly attached to a bracket assembly 62 as best illustrated in FIGS. 9 and 10. The bracket assembly 62 is shaped and contoured so as to conform to the rear portion of a conventional shoe as best illustrated in FIG. 11 and includes a pair of downwardly extending flange portions 64 as best shown in FIGS. 9, 10 and 12. The flange portions 64 are formed integral with the respective side brace portions 66 so as to form a substantially U-shaped channel or space 68 therewith as best shown in FIG. 12. The downwardly extending flange portions 64 are positioned inwardly from the side brace portions 66 and, when engaged with a particular shoe, the channel means 68 formed therebetween engage the upper rim portion of the shoe at opposed sides thereof as best illustrated in FIG. 8. When so engaged, the flange portions 64 extend into the interior of the shoe. This configuration provides stability to the bracket assembly 62 and prevents such assembly from moving unnecessarily during movement. Other bracket flange portions 65 and 67 are designed to partially overlap the battery pack 54 (FIGS. 9 and 10) so as to hold and retain the same in proper position on the assembly 62 during use yet the positioning of such flange portions is such that the battery or batteries used to power the unit 52 can be easily removed and replaced. Other bracket configurations for accessing and removing/changing the batteries associated with unit 52 are likewise possible and contemplated. Because the flange portions 64 extend into the inner portion of the shoe to which they are attached, it is preferred that at least the bracket portions 64 be dimensioned relatively thin and that such portions be made of a material which will not cause undue discomfort to the user.

As best illustrated in FIGS. 8 and 11, the free end portion of each of the linear optical conduits 60 include a hook or clamp member 70 positioned therealong so as to engage the ties or laces associated with a particular shoe as shown in FIG. 8. Each hook or clamp member 70 preferably includes a tubular body portion 72 dimensioned so as to insertably receive the conduit 60 therethrough, the hook members 70 being slidably movable and adjustable along the length of the conduit 60 so that they can be positioned to engage a particular lace or tie. Once properly positioned for engagement with a particular lace or tie, the hook members 70 may be held in the desired position by means of a set screw 74 or other suitable holding or locking means. The hook members 70 serve to fixedly secure the free end portion of each of the linear optical conduits 60 to the exterior portion of the shoe during use thereby providing still further stability to the overall unit 52 when attached to a particular shoe. It is also recognized that any plurality of such hook or clamp members 70, or other fastening means, may be utilized in conjunction with each linear optical conduit 60 so as to both hold and retain the conduits 60 in close proximity to the exterior portion of the shoe during use. The free end portion of each linear optical conduit 60 may likewise include a reflective cap member 76 which will reflect that portion of the light conducted therethrough which would normally exit the free end portion of the optical conduit 60 back through such conduit in the opposite direction so as to increase the overall illumination intensity thereof.

FIGS. 13 and 14 illustrate alternative embodiments of the self-contained portable illumination unit 52 illustrated in FIGS. 8–12. More particularly, the embodiment 78 illustrated in FIG. 13 is substantially identical in construction and operation to the illumination unit 52 but differs therefrom only in that the linear optical conduit or other sideglow type fiber optic material 80 is a single continuous piece of optical conduit which extends substantially completely around the entire upper portion of a shoe from each opposite side of light source 82 as illustrated. Each opposite end portion of the optical conduit 80 is attached to respective coupling means as previously described with respect to other embodiments of the present invention such that the respective end portions thereof lie adjacent to the respective light and filter means. The construction and operation of all of the other components comprising the illumination unit 78 is identical to that disclosed with respect to unit 52 including the bracket assembly 62.

FIG. 14, on the other hand, discloses an embodiment 84 which differs from the unit 52 only in that the linear optical conduit 60 which would be positioned between the legs of a user has been eliminated. Instead, such embodiment includes only the optical conduit 60 which would wrap around that portion of the shoe which faces outwardly away form the body of the wearer. In this particular construction, the light housing 86 includes a single light source and a single filter member 88. The construction and operation of all of the other components comprising the illumination unit 84 including the optical conduit 60, the bracket assembly 62, the hook member 70, the reflective end cap 76, and the light and filter means 86 and 88 respectively are identical to those similar components disclosed with respect to embodiment 52.

It is also anticipated that the portable illumination units 52, 78 and 84 can likewise be utilized in conjunction with shoes that do not include ties or laces. In this situation, the hook or clamp members 70 may be replaced with other suitable holding means such as a suction cup type member which would engage the exterior portion of a shoe when pressed thereagainst. Still further, it is recognized and anticipated that the bracket assembly 62 may take on a wide variety of other shapes and configurations and it is recognized that the present bracket assembly can also be constructed to engage the upper rim portion of a shoe adjacent a side portion thereof without departing from the spirit and scope of the present invention. It is also anticipated that the present bracket assembly can likewise be designed and structured so as to be used in conjunction with boots, skates, or other types of high-top shoes.

Still further, it is important to note that the particular linear optical conduit configuration or pattern illustrated in embodiments 52 (FIG. 11) and 84 (FIG. 14) can likewise be incorporated into the shoe constructions illustrated in embodiments 10 (FIG. 1) and 46 (FIG. 6). Other conduit pattern variations are likewise possible, contemplated and within the scope of the present invention.

Also, importantly, a unique feature of the linear optical conduit utilized with the present invention, particularly, the "LUMENYTE"® linear side-glow fiber optical material, is its shapeability or sculptability, that is, it can be manipulated to produce various patterns on the shoe. This can be accomplished in most cases by heating the optical conduit such as with a heating blanket to a certain temperature range as specified depending upon the particular optical conduit being utilized, thereafter shaping such conduit into various configurations while heated, and thereafter subsequently allowing such conduit to cool so as to retain the particular patterned shape. This sculptability can be accomplished in any of the different embodiments disclosed herein including the embodiments 10 and 46 which are formed substantially integral with a particular shoe as well as all of the portable self-contained embodiments disclosed in FIGS. 8–14.

Thus, there has been shown and described several embodiments of footwear utilizing novel illuminated linear optics, which footwear fulfill all of the objects and advantages sought therefore. Many changes, modifications, variations, and other uses and applications of the present constructions will, however, become apparent to those skilled in the art after considering this specification and the accompanying drawings. All such changes, modifications, variations and other uses and applications which do not depart from the spirit and scope of the invention are deemed to be covered by the invention which is limited only by the claims which follow.

What is claimed is:

1. Illumination means removably attachable to footwear wherein the footwear includes front, rear and opposed side portions, said illumination means comprising a power source, at least one light source operatively connected to said power source, at least one side-glow fiber optic conduit having opposed end portions, a bracket assembly including means for holding and retaining said power source and said light source, said side-glow fiber optic conduit being capable of emitting light conducted therethrough radially outwardly through its circumferential periphery along substantially its entire length, at least one end portion of said side-glow fiber optic conduit being positioned and located adjacent to said light source, means for holding the one end portion of said side-glow fiber optic conduit adjacent said light source for directing light thereto, said side-glow fiber optic conduit being illuminated substantially along its entire circumferential periphery when said light source is illuminated, and means for removably attaching said bracket assembly to footwear, said side-glow fiber optic conduit extending adjacent to at least a portion of one side portion of the footwear when said bracket assembly is attached thereto.

2. The illumination means defined in claim 1 including means operatively connected to said light source and to said power source for selectively controlling illumination of said light source.

3. The illumination means defined in claim 1 including filter means positioned between said light source and said one end portion of said side-glow fiber optic conduit, said filter means determining the color of light directed towards said conduit end portion.

4. The illumination means defined in claim 1 including means slidably movable along at least a portion of said side-glow fiber optic conduit for attaching said fiber optic conduit to the footwear when said bracket assembly is attached thereto.

5. The illumination means defined in claim 4 wherein said slidably movable attachment means includes at least one hook member positionable to engage the laces associated with particular footwear.

6. The illumination means defined in claim 1 including a second side-glow fiber optic conduit having opposed end portions, at least one end portion of said second side-glow fiber optic conduit being positioned adjacent to said light source, means for holding and retaining the one end portion of said second side-glow fiber optic conduit adjacent said light source, said second side glow fiber optic conduit extending adjacent to at least a portion of the opposed side portion of the footwear when said bracket assembly is attached thereto.

7. The illumination means defined in claim 1 including a reflective cap member engageable with one end portion of said side-glow fiber optic conduit.

8. The illumination means defined in claim 1 wherein said side-glow fiber optic conduit extends substantially around the front portion of the footwear such that the other opposed end portion thereof is positioned adjacent said light source, and means for holding and retaining said other opposed conduit end portion adjacent said light source.

9. The illumination means defined in claim 8 wherein said light source includes at least two light sources, one light source being positioned adjacent one end portion of said side-glow fiber optic conduit and the other light source being positioned adjacent the opposed end portion thereof.

10. The illumination means defined in claim 1 wherein said bracket assembly attachment means is attachable to the rear portion of the footwear.

11. The illumination means defined in claim 1 wherein said side-glow fiber optic conduit includes a light transmitting core surrounded by a tubular cladding made of heat shrinkable material housed within a clear semi-rigid finish jacket.

12. The illumination means defined in claim 11 wherein said tubular cladding is uniformly spaced from said light transmitting core.

13. The illumination means defined in claim 11 wherein the refractive index of said tubular cladding is relatively low compared to the refractive index of said light transmitting core.

14. Illumination means removably attachable to footwear wherein the footwear includes front, rear and opposed side portions, said illumination means comprising a power source, at least one light source operatively connected to said power source, at least one fiber optic conduit having opposed end portions, a bracket assembly including means for holding and retaining said power source and said light source, said fiber optic conduit having a light transmitting core surrounded by a cladding made of a heat shrinkable material, said light transmitting core and said cladding being housed within a substantially clear, semi-rigid finish jacket, a uniform space existing between the inner periphery of said cladding and the outer periphery of said light transmitting core, said fiber optic conduit being capable of emitting light through its circumferential periphery along the length thereof, at least one end portion of said fiber optic conduit being positioned and located adjacent to said light source, means for holding the one end portion of said fiber optic conduit adjacent said light source for directing light thereto, said fiber optic conduit being illuminated along its entire length when said light source is illuminated, and means for removably attaching said bracket assembly to footwear, said fiber optic conduit extending adjacent to at least a portion of one side portion of the footwear when said bracket assembly is attached thereto.

* * * * *

UNITED STATES PATENT AND TRADEMARK OFFICE
CERTIFICATE OF CORRECTION

PATENT NO.   : 5,502,903
DATED        : April 2, 1996
INVENTOR(S)  : Dale E. Barker It is certified that error appears in the above-indentified patent and that said Letters Patent is hereby corrected as shown below:

Column 1, line 55, "an" should be --art--.

Column 3, line 29, "sell:contained" should be --self-contained--.

Column 3, line 39, after "thereof" insert --.--.

Column 6, line 5, "Costa Mesa." should be --Costa Mesa,--.

Signed and Sealed this

Fifth Day of November, 1996

Attest:

BRUCE LEHMAN

*Attesting Officer*   *Commissioner of Patents and Trademarks*